United States Patent [19]

Becker-Endrigkeit et al.

[11] Patent Number: 4,898,430

[45] Date of Patent: Feb. 6, 1990

[54] TRACTION SLIP AND BRAKE SLIP-CONTROLLED BRAKE SYSTEM

[75] Inventors: Horst P. Becker-Endrigkeit, Frankfurt am Main; Joachim Maas, Griesheim, both of Fed. Rep. of Germany

[73] Assignee: Alfred Teves GmbH, Frankfurt am Main, Fed. Rep. of Germany

[21] Appl. No.: 287,310

[22] Filed: Dec. 20, 1988

[30] Foreign Application Priority Data

Dec. 24, 1987 [DE] Fed. Rep. of Germany ....... 3744071

[51] Int. Cl.$^4$ .......................... B60T 8/34; B60T 8/40; F16K 31/12; F16K 39/00
[52] U.S. Cl. .................................. 303/84.2; 303/113; 303/116; 251/31; 251/282
[58] Field of Search ................. 303/10, 59, 61, 84.2, 303/98, 110, 111, 113, 114, 116, 119; 188/151 R, 181 R, 181 A; 180/197; 251/31, 282

[56] References Cited

U.S. PATENT DOCUMENTS

| | | | |
|---|---|---|---|
| 2,918,249 | 12/1959 | Page et al. | 251/31 |
| 3,648,968 | 3/1972 | Reid et al. | 251/282 |
| 3,674,317 | 7/1972 | Mangold | 303/111 |
| 3,907,376 | 9/1975 | Drutchas | 303/98 |
| 4,453,782 | 6/1984 | Arikawa et al. | 303/119 X |
| 4,589,706 | 5/1986 | Leiber | 303/114 |
| 4,682,756 | 7/1987 | Härtwig et al. | 251/282 X |
| 4,750,788 | 6/1988 | Seibert et al. | 303/111 X |
| 4,768,843 | 9/1988 | Braughman | 180/197 X |
| 4,793,663 | 12/1988 | Ocvirk et al. | 303/119 X |
| 4,828,338 | 5/1989 | Ocvirk et al. | 303/111 X |

*Primary Examiner*—Robert J. Oberleitner
*Assistant Examiner*—Timothy Newholm
*Attorney, Agent, or Firm*—Robert P. Seitter

[57] ABSTRACT

A dual-circuit brake system in which diagonally opposite wheels of an automotive vehicle are in communication with each brake circuit and, in the event of a traction slip control, the non-actuated wheel is hydraulically separated from the brake conduit. The valve is hydraulically driven, with the pressure difference between the pressure in the master brake cylinder (1) and the pressure in the pressure conduits (24, 25) being used as the switching pressure. By that measure, the valve is less susceptible to trouble and provides lower production costs.

8 Claims, 2 Drawing Sheets

TRACTION SLIP AND BRAKE SLIP-CONTROLLED BRAKE SYSTEM

BACKGROUND OF THE INVENTION

The present invention relates to a traction slip and brake slip-controlled brake system for automotive vehicles with a driven and a non-driven axle.

A brake system of this type is disclosed, for example, in published German patent document DE-OS No. 34 07 538, which describes a dual circuit brake system of diagonal division for an automotive vehicle having a driven front axle. The wheels of a diagonal, for example, the front-left wheel and the rear-right wheel, are jointly controlled by an outlet and an inlet valve. The outlet valve establishes communication with a reservoir whereas the inlet valve controls the communication with a pressure source.

In brake slip control, a connection is established to a pressure source in which a pressure proportional to the pedal force is generated. This pressure may be generated by a pump the pressure of which is determined by the master cylinder pressure, or by a brake pressure control valve reducing an accumulator pressure to a pressure in proportion to the pedal force. In traction slip control, the brake circuits are connected to a pressure source generating a pressure independently of the pedal force. Significantly, in traction slip control, the connection of the first pressure source, which generates a pressure in proportion to the pedal force to the brake circuits, is interrupted. Because of this, the second pressure source generating a pressure independent of the pedal force would be ineffective as there would be a connection to the non-pressurized reservoir through the non-actuated first pressure source.

Moreover, a separating valve is provided in the branch conduit leading to the brakes of the non-driven axle, such as the rear axle, which separating valve blocks the connection in the event of traction slip control. This is required because the non-driven wheels in the start-up process must not be pressure-loaded. In the prior art, this valve generally takes the form of an electromagnetically driven 2-way/2-position valve. Valves of this type exhibit a number of disadvantages in that they are expansive and permanently loadable only to a limited extent. This is, they are energizable for only a short period of time. The valve must be blocked during the entire period of a traction slip control. This means that during that time electrical current flows through the energizing coils with the result that the valve is excessively heated with the result that the valve no longer works properly as heat expansion causes jamming of parts of the valve. Accordingly, a hydraulic drive of the valves rather that an electromagnetic one has been resorted to.

SUMMARY OF THE INVENTION

It is, therefore, an object of the present invention to provide a separating valve drive which is safe in operation and inexpensive to produce. This object is solved by switching of the valve based on certain hydraulic information. In conventional deceleration, that is, deceleration with no slip control, the pressure ahead of and behind the blocking valve is identical. This will also apply once brake slip control commences. Only in the event that a traction slip control is performed, the blocking valve is closed so that, on the one side of the blocking valve, the master cylinder pressure prevails. In that case, the pressure corresponds to zero as the master cylinder is not actuated. On the other side, the pump pressure for the traction slip control prevails. The difference between the pressure prevailing before and behind the blocking valve therefore can be utilized for driving the separating valve.

It is particularly advantageous if the separating valve includes a switch piston having two opposing effective faces, with pump pressure being applied to the one face while master cylinder pressure is applied to the other face. The valve configuration will be particularly simple if provision is made for a core or ring piston. The core piston includes one front face thereof confining the inlet chamber of the valve and, with the other front face thereof confining a counter-pressure chamber. In this case, these chambers are combined through a connecting line and the core piston, in the central area thereof, exhibits a ring, with the ring faces constituting the faces of opposite effect.

Following the inlet chamber is the outlet chamber connected to the wheel brake, with the connection between these two chambers being established through a bore seated on a closure valve. The closure valve can be pushed open by a plunger located on the switch piston. The piston is spring-loaded in the opening direction. If all valves are combined to a valve block, control conduits through hoses can be avoided, with the interconnections being established through ports in the valve block.

BRIEF DESCRIPTION OF THE DRAWINGS

The invention will now be described in greater detail with reference to the accompanying drawing wherein.

DETAILED DESCRIPTION OF A PREFERRED EMBODIMENT

Figure 1:
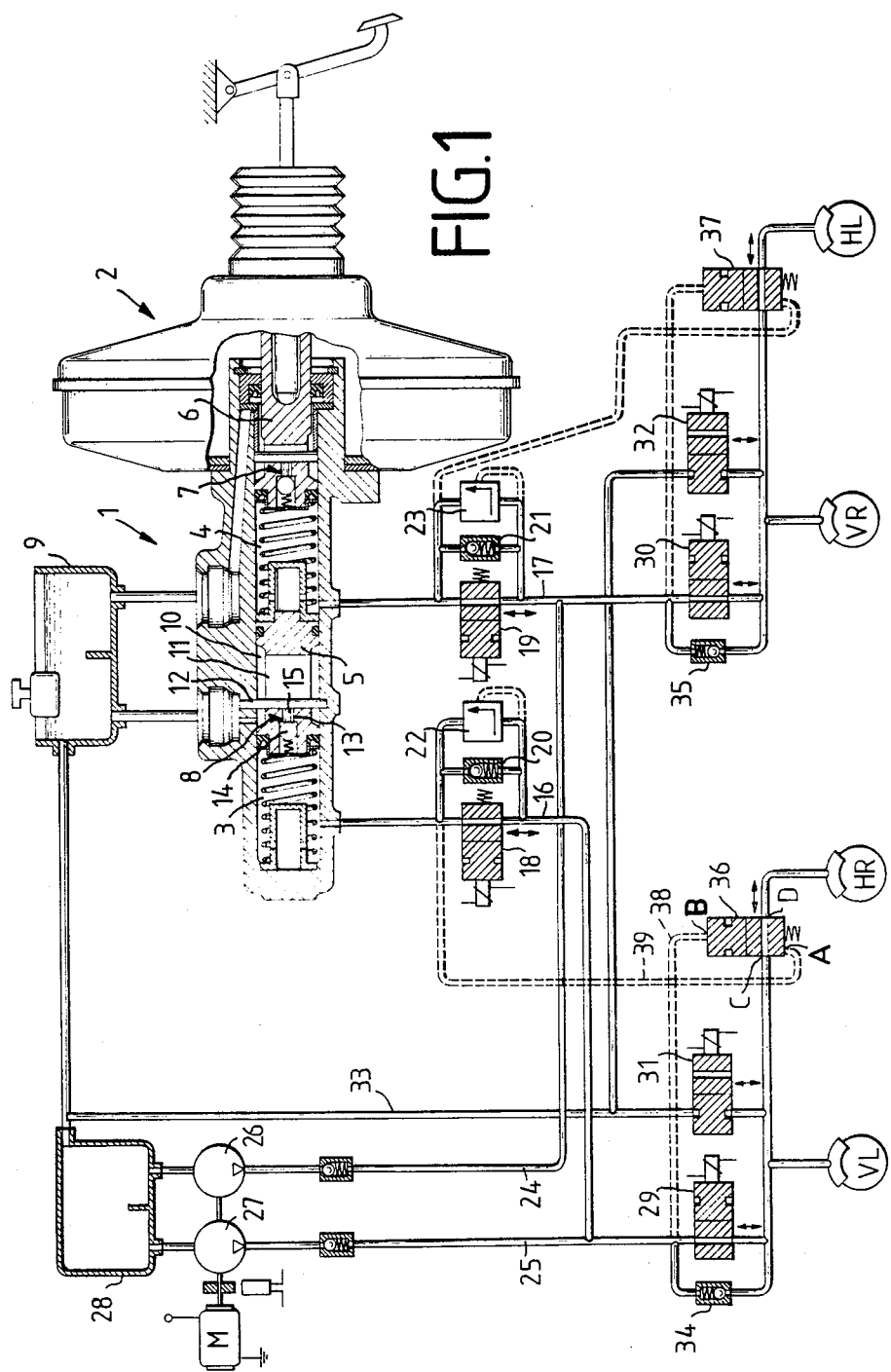
FIG. 1 describes the brake system in accordance with the present invention; and, FIG. 2 illustrates one embodiment of the hydraulically driven separating valve to use for the system of FIG. 1.

The brake system comprises a tandem master cylinder 1 having a pneumatic booster 2 coupled thereto. Working chambers 3, 4 of tandem master cylinder 1 are confined by floating piston 5 and by the pushrod piston 6. Disposed in the pistons 5, 6 are central valves 7, 8 which, in the brake release position of the tandem master cylinder, establish a connection between the working chambers 3, 4 and the reservoir 9. During actuation of the master brake cylinder by means of the schematically illustrated pedal, the central valves 7, 8 will take their closing position to enable a brake pressure to be built up in the working chambers 3, 4.

The operation of the central valves will now be explained with reference to central valves 8 in the floating piston 5. The floating piston 5 exhibits an annular chamber 10 in communication with the reservoir 9. Moreover, a slot 11 is provided in the floating piston 5 through which a pin 12 is guided and rigidly secured to the housing. In addition, there is an axial bore between working chamber 3 and slot 11. Disposed in that bore is a ball 14 forced by a spring against a sealant. Disposed between the ball 14 and the pin 12 rigidly secured to the housing, is a plunger 15 lifting the ball 14 off the sealant once the piston 5 takes its basic position. Once the piston 5 is displaced in the actuating direction the plunger 15 is removed from the pin 12 thereby enabling the ball to about the sealant.

The central valve in the pushrod piston is of a corresponding configuration except that the pin 12 is not rigidly secured to the housing but is rather attached to a sleeve. The sleeve is provided with a rear stop insuring that the central valve, in the brake releasing position, is kept open. With the brake applied, the pin first displaces relative to the pushrod piston so that the plunger 15 will no longer be able to force the ball 14 away from the sealing seat and is then entrained by the working piston. Connected to the working chambers 3, 4 are brake conduits 16, 17 with the brake conduit 16 leading to the front-sided left-hand wheel VL and to the rear-sided right-hand wheel HR. The brake conduit 17 leads to the front-right wheel VR and the the rear-left wheel HL. Provided in the brake conduits immediately behind the master brake cylinder are blocking valves 18, 19. Switched in parallel to the blocking valves 18, 19 are respectively one check valve 20, 21 and a pressure limiting valve 22, 23.

Below the blocking valves, pressure conduits 24, 25 of pumps 26, 27 terminate in the brake conduits 16, 17. The pumps deliver from the reservoir 9, through an intermediate reservoir 28, into the pressure conduits 24, 25. The inlet valves 29, 30 are disposed below the discharge of the pressure conduits 24, 25. The said inlet valves are electromagnetically driven and, in de-energized condition, permit pressure fluid to flow therethrough. respectively one branch conduit leads to a wheel of the front axle and to a wheel of the rear axle, it being noted that in the present embodiment, the front axle is driven. The branch conduit leading to the non-actuated rear axle contains a hydraulically driven separating valve 36, 37. If the system is to be employed with an automotive vehicle with an actuated rear axle, the separating valve is provided in the conduit of the front axle. Outlet valves 31, 32 are provided for the pressure regulation in the wheel brakes, which outlet valves are inserted into the relief conduit 33 leading to the reservoir 9. These valves also are electromagnetically driven valves closed in de-energized condition.

The separating valves 36, 37 contain two control connections A and B, with the control connection B, through a control conduit 38 following the partial section of the brake conduit 16 located between the blocking valve 18 and 19, respectively, and the inlet valve 29 and 30. The control connection A, through a control conduit 39, is in communication with the section of the brake conduit located between the master brake cylinder 1 and the blocking valve 18 and 19, respectively. Connection C forms the pressure return and D the connection to the wheel brake.

Figure 2:
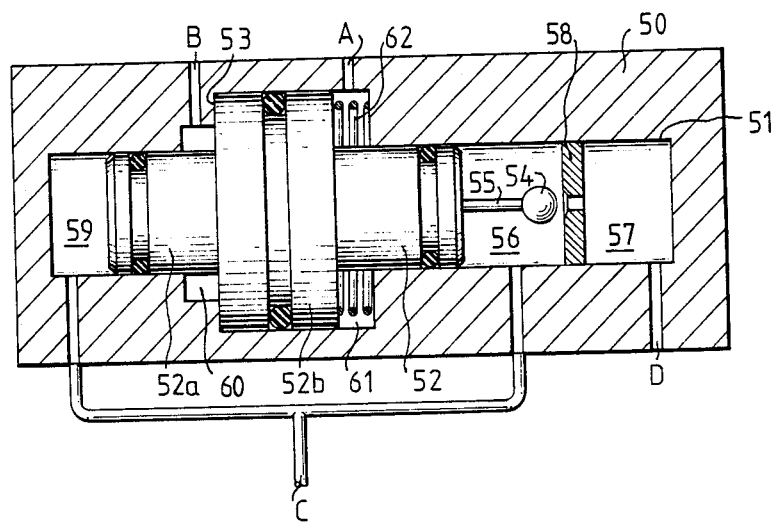

The separating valves 36, 37 are of identical configuration and are shown in detail in FIG. 2. The separating valve is made up of a housing 50 in which is provided a multiple stepped port 51. In the right-hand part of the bore, according to FIG. 2, there is provided an inlet chamber 56 communicating with connection C, and the outlet chamber 57 communicating with connection D. The two chambers are separated from one another by a perforated wall 58.

The inlet chamber 56 is further confined by a switch piston 52 formed of a core piston 52a and an annular piston 52b. While the one front side of the core piston, hence, confines the inlet chamber 56, the other side of the core piston confines the counter-pressure chamber 59, which, though a conduit, also is in communication with the connection C. Hence, the inlet chamber 56 and in the counter-pressure chamber 59 identical pressures prevail thereby neutralizing the pressure forces exerted on the piston. The annular piston 52b, with the one annular face thereof, confines the connecting chamber 61 in communication with connection A, and, on the other side, confines the connecting chamber 60 in communication with connection B.

Located on piston 52 is stem 55 with valve closure member 54, with the closure member 54, during displacement of the piston 52 to the right, sealingly abutting the bore in the wall 58. The connection between the inlet chamber 56 and the outlet chamber 57 is interrupted. Once the piston 52, assisted by the force of spring 62, is moved to the left against the stop 53, the connection between the inlet chamber 56 and the outlet chamber 57 is opened.

The operation of the system will now be described as follows. With the brake not applied, all parts as shown hold the position as illustrated and the valves are in the switching position as shown. With the brake applied by means of the pedal, the master cylinder 1, after closure of the central valves 7 and 8, is pressurized. As the valves 18, 29, 36 and 19, 30, 37, respectively, are open the master cylinder pressure will propagate to the wheel brakes. The automotive vehicle will be decelerated. The pressure conduits 24, 25 are locked by the check valves (not illustrated with numerals). Once the sensors measuring the wheel rotating pattern and the analyzing electronics determine that one of the wheels tends to lock, the brake slip control will commence. For this purpose, first (depending on which of the wheels tends to lock) the outlet valve 31 and 32, respectively, is opened and the inlet valve 29 and 30, respectively, is closed, thereby decreasing the pressure in the corresponding wheel brake. The pressure decrease is respectively effected in the whole of the diagonal, with the control algorithm orienting itself by the rotating pattern of the respectively front wheel.

Moreover, a switch signal is supplied to the motor of pumps 26, 27 now delivering, through pressure conduits 24, 25, into the bake conduit 16, 17. A part of the pressure fluid flows, through the open blocking valves 18, 19, into the master brake cylinder thereby pushing back the pistons thereof into their basic position. When reaching the basic position, the central valves open to thereby enable excess pressure fluid to flow off while, at the same time, a pressure in proportion to the pedal force, is left in the master brake cylinder. The central valves act as central control valves.

Once an adequate re-acceleration of the driven wheels has been achieved by the pressure decrease in the wheel brakes, the outlet valve 31 and 32, respectively, is closed and the inlet valve 29, 30 opened thereby enabling a renewed pressure build-up to be effected. The separating valves 36, 37 will always remain in their open position as always the same pressure will prevail on the pressure connections A and B in view of the opened blocking valves 18, 19.

In the traction slip control mode, the operation is as follows: Once it is determined, during the start-up operation or during driving that one of the driving wheels VL, VR tends to race, pressure is applied to the wheel brakes of the wheels by switching blocking valves 18, 19 to thereby interrupt the brake conduits 18, 19. Moreover, the motor of pumps 26, 27 is turned on so that the pumps now deliver to the wheel brakes. The pump pressure is determined by the pressure limiting valves 22, 23, with the output side of the pressure limiting valves being in abutment with the master cylinder which, as the brake is not applied, is in communication with the reservoir 9. That is, it is non-pressurized. Hence, a pressure difference exists in the control conduits 38, 39 as the pump pressure is applied to the conduit 38 and the conduit 39 is non-pressurized, with the result that the separating valve hereinafter described in further detail will block so that no pressure is applied to the wheel brakes of the non-driven rear wheels in the event of a traction slip control By switching the valves 29, 31 and 30, 32, respectively, the motor brake moment can be compensated to such an extent that the wheels will just transfer a driving force to the road that is adjusted to the friction ratio between tires and lane.

The check valves 20, 21 act as safety valves. For, if the blocking valves 18, 19 remain in their blocking position after completion of a traction slip control, pressure can be applied to the wheel brakes through the check valves 20, 21. The valves 34, 35 switched in parallel to the inlet valves 29, 30, enable the driver to interfere with a brake slip control. For, if the pressure applied to the pedal is reduced, the pump pressure will also decrease which, through the check valve, is transferred to the wheel brakes such that the wheel brake pressure cannot be in excess of the brake pressure desired by the driver. Once the brake pedal is completely released, the brake slip control is interrupted.

The separating valves work on the following pattern: Chambers 56, 59 are always in abutment with connection C and are exposed to brake pressure or to the pressure adjusted by the valves 29, 31. The spring 62 holds the piston 52 on the stop 53 such that the passage between chambers 56, 57 is opened. During a deceleration with no brake slip control or a brake slip control, the same pressure prevails at connections A and B, as previously set forth. The forces exerted on the annular piston 52b, hence, are equally balanced so that the piston 52 is held on the stop 53 by the spring 62.

During a traction slip control, the pressures on connections A and B differ. While connection A is non-pressurized, connection B is under the pump pressure determined by the pressure limiting valves 22, 23. This force will be sufficient to overcome the force of spring 62 such that the piston 52 moves to the right whereby the closure member 54 moves into abutment with the passage bore in the wall 58. The chambers 56, 57 are hydraulically separated from one another so that a pressure build-up in connection C does not result in a pressure build-up on connection D.

What is claimed is:

1. A traction slip and brake slip-controlled brake system for an automotive vehicle having a driven and non-driven axle and having vehicle wheels and wheel brakes coupled to each of the axles, comprising a brake pressure generator in communication with a brake conduit, further comprising a blocking valve provided in the brake conduit section immediately behind the brake pressure generator, a pump which below the blocking valve is in communication with the brake conduit, a follower inlet-valve and a relief conduit terminating below the inlet valve into the brake conduit and switched into which is an outlet valve, further comprising branch conduits to the wheel brakes of the driven and non-driven axles, provided with a separating valve in the branch conduit to the wheel brake of the non-driven axle, further comprising wheel sensors and electronic circuits for determining the wheel rotating pattern and for generating brake pressure control signals for the inlet and outlet valves, wherein the separating valve comprises two control connections which, through first and second control are connected to the brake pressure generator and to a pump pressure conduit respectively, and wherein the separating valve includes a switch piston means and a valve closure member, said switch piston means being operable in a traction control mode to close said valve closure member in response to a pressure differential between the respective connections of said first and second control conduits, thereby separating the wheel brake of the non-driven axle from the wheel brake of the driven axle.

2. The brake system according to claim 1, wherein the brake pressure generator is a master brake cylinder the central valves of which are formed as pump pressure regulating valves.

3. The brake system according to claim 1, wherein a check valve blocking toward the master brake cylinder and a pressure control valve are switched in parallel to the blocking valve.

4. The brake system according to claim 1, wherein the switch piston means has two oppositely directed pressure faces to which the pressure prevailing on said connections are respectively applied.

5. A traction slip and brake slip-controlled brake system for an automotive vehicle having a driven and a non-driven axle and having vehicle wheels and wheel brakes coupled to each of the axles, comprising a brake pressure generator in communication with a brake conduit, further comprising a blocking valve provided in the brake conduit section immediately behind the brake pressure generator, a pump which below the blocking valve is in communication with the brake conduit, a follower inlet-valve and a relief conduit terminating below the inlet valve into the brake conduit and switched into which is an outlet valve, further comprising branch conduits to the wheel brakes of the driven and non-driven axles, provided with a separating valve in the branch conduit to the wheel brake of the non-driven axle, further comprising wheel sensors and electronic circuits for determining the wheel rotating pattern and for generating brake pressure control signals for the inlet and outlet valves, wherein the separating valve comprises two control connections which, through first and second control conduits are connected to the brake pressure generator and to a pump pressure conduit respectively, and wherein the separating valve blocks at a pressure difference on said connections, wherein the separating valve includes a switch piston having two oppositely directed pressure faces to which the pressures prevailing on said connections are respectively applied, wherein said switch piston cooperates with a valve closure member, and wherein the switch piston comprises a core and an annular piston, with front faces of the core piston being exposed to the brake conduit pressure and with annular faces of the annular piston being exposed to the pressures prevailing in said connections.

6. The brake system according to claim 5, wherein secured to the switch piston is a plunger which is brought into abutment with the valve closure member.

7. The brake system according to claim 6, wherein the valve closure member controls a connecting port between an inlet and an outlet chamber of the separating valve.

8. The brake system according to claim 7, wherein the blocking valve, the separating valve and the inlet and outlet valves are combined to form a valve block.

* * * * *